United States Patent
Takagi

(10) Patent No.: US 9,438,789 B2
(45) Date of Patent: Sep. 6, 2016

(54) DISPLAY CONTROL APPARATUS AND DISPLAY CONTROL METHOD

(71) Applicant: CANON KABUSHIKI KAISHA, Tokyo (JP)

(72) Inventor: Yousuke Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 14/642,560

(22) Filed: Mar. 9, 2015

(65) Prior Publication Data
US 2015/0264253 A1    Sep. 17, 2015

(30) Foreign Application Priority Data

Mar. 11, 2014  (JP) ................ 2014-048124

(51) Int. Cl.
*H04N 5/232* (2006.01)
*G06F 3/0484* (2013.01)
*H04N 1/00* (2006.01)
*G06F 3/0488* (2013.01)

(52) U.S. Cl.
CPC ........ *H04N 5/23216* (2013.01); *G06F 3/0488* (2013.01); *G06F 3/04845* (2013.01); *H04N 1/00411* (2013.01); *H04N 1/00458* (2013.01); *H04N 1/00469* (2013.01); *H04N 5/23293* (2013.01); *G06F 2203/04806* (2013.01)

(58) Field of Classification Search
CPC ............. H04N 5/23216; H04N 1/00458; H04N 1/00469; H04N 1/00411; H04N 5/23293; G06F 3/0488; G06F 3/04845; G06F 2203/04806
See application file for complete search history.

(56) References Cited

U.S. PATENT DOCUMENTS

| 2006/0038908 A1 | 2/2006 | Yoshino |
| 2009/0019399 A1 | 1/2009 | Matsunaga et al. |
| 2012/0174029 A1* | 7/2012 | Bastide ............... G06F 3/0488 715/800 |
| 2013/0083222 A1* | 4/2013 | Matsuzawa ........ H04N 5/23212 348/240.3 |
| 2014/0085223 A1* | 3/2014 | Liang ................ G06F 3/017 345/173 |
| 2015/0220255 A1* | 8/2015 | Maeda ............... H04N 1/00411 715/764 |
| 2015/0222814 A1* | 8/2015 | Li ...................... G06F 3/04845 348/239 |

FOREIGN PATENT DOCUMENTS

| EP | 2161652 A1 | 3/2010 |
| JP | 2004-056199 A | 2/2004 |
| JP | 2006-060387 A | 3/2006 |
| JP | 2010-101977 A | 5/2010 |
| WO | 2011/040864 A1 | 4/2011 |

* cited by examiner

*Primary Examiner* — Twyler Haskins
*Assistant Examiner* — Padma Haliyur
(74) *Attorney, Agent, or Firm* — Canon USA, Inc. IP Division

(57) ABSTRACT

A display control apparatus includes: a detection unit to detect touch operations; a display control unit to effect control such that a portion of an image is displayed on a display unit rather than an entire image; a portion changing unit to change a displayed portion of the image when a portion of the image is being displayed, according to a predetermined touch operation including moving of a touch position having been performed from outside of a predetermined region; and a control unit to effect control such that, when a portion of the image is being displayed, the displayed image is switched to a different image and a display portion of the different image is displayed on the display unit based on the display portion of the image before switching, according to the predetermined touch operation including moving of a touch position having been performed from outside the predetermined region.

27 Claims, 11 Drawing Sheets

DISPLAY CONTROL APPARATUS AND DISPLAY CONTROL METHOD

BACKGROUND OF THE INVENTION

1. Field of the Invention

The present invention relates to a display control apparatus, a display control method, a program, and a recording medium storing the program, enabling switching from a state of an enlarged display of an image to display of another image.

2. Description of the Related Art

As of recent, increase in capabilities of digital cameras to perform continuous shooting operations is notable. There are also more situations where users perform continuous shooting operations. The user can compare multiple images shot of the same subject, and select a desired image. In doing so, the user displays focused portions of photographed images in an enlarged manner to confirm whether or not details of the images are in focus, and compares the images. In conventional cameras, focused portions of the multiple images obtained by continuous shooting operations are displayed in an enlarged manner, the same position in the images being confirmed by switching among the images with the enlarged position and enlargement factor maintained, using a four-way operational key or an operating member (Japanese Patent Laid-Open No. 2006-60387). On the other hand, changing of enlargement factor and moving of the enlarged position is performed by touch operations on display apparatuses of recent years equipped with touch panels.

Japanese Patent Laid-Open No. 2010-101977 discloses a method of switching from a first image to a second image in a touch-panel display control apparatus, where an enlarged first image and second image are handled as one continuous image, and the content of the display on the display screen is moved according to dragging operations performed by the user. However, while the display control apparatus disclosed in Japanese Patent Laid-Open No. 2010-101977 displays the enlarged first image on to the second image by the dragging operation, the second image is displayed without the enlargement factor and enlarged position of the first image being maintained. On the other hand, while a display control apparatus disclosed in Japanese Patent Laid-Open No. 2006-60387 displays the next image with the enlargement factor and enlarged position of the first image being maintained, instruction to this effect cannot be made by a touch operation.

SUMMARY OF THE INVENTION

It has been found desirable to provide a display control apparatus capable of performing image feeding by touch operations with good operationality and with the enlargement factor and enlarged position being maintained.

According to an aspect of the present invention, a display control apparatus includes: a detection unit configured to detect touch operations; a display control unit configured to effect control such that a portion of an image is displayed on a display unit rather than an entire image; a portion changing unit configured to change a displayed portion of the image when a portion of the image is being displayed, in accordance with a predetermined touch operation including moving of a touch position having been performed from outside of a predetermined region; and a control unit configured to effect control such that, when a portion of the image is being displayed, the displayed image is switched to a different image and a display portion of the different image is displayed on the display unit based on the display portion of the image before switching, in accordance with the predetermined touch operation including moving of a touch position having been performed from within the predetermined region.

Further features of the present invention will become apparent from the following description of embodiments with reference to the attached drawings.

DESCRIPTION OF THE EMBODIMENTS

An embodiment of the present invention will be described in detail below with reference to the accompanying drawings.

It is to be noted that the following embodiment is merely one example for implementing the present invention and can be appropriately modified or changed depending on individual constructions and various conditions of apparatuses to which the present invention is applied. Thus, the present invention is in no way limited to the following embodiment.

Figure 1:
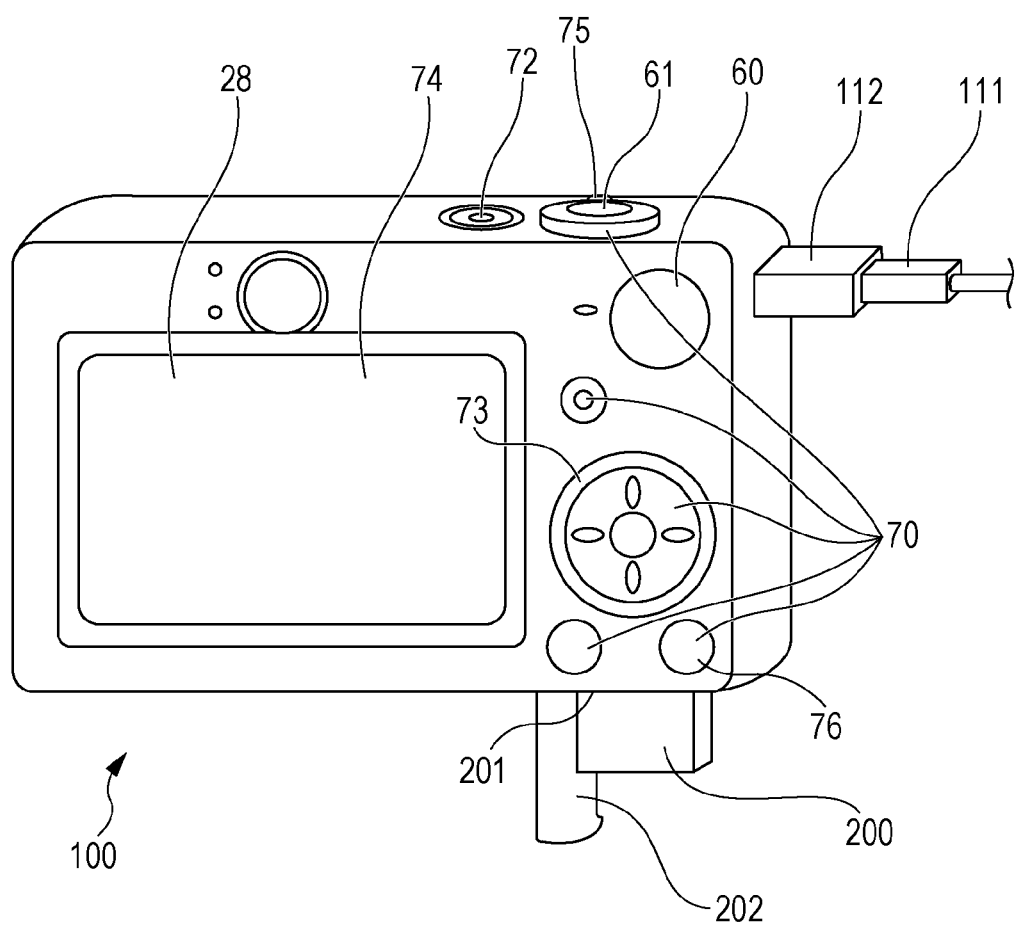
FIG. 1 is an external perspective view of a digital camera as an example of an apparatus to which the configuration of an embodiment can be applied.

An embodiment to carry out the present invention will be described below in detail with reference to the attached drawings. FIG. 1 is an external perspective view of a digital camera 100 serving as an example of an imaging apparatus according to the present invention. A display unit 28 (display screen) displays images and various types of images. A shutter button 61 is an operation unit to give image shooting instructions. A mode switchover switch 60 is an operation unit to switch over between various types of modes. A connector 112 connects a connection cable 111 and the digital camera 100. An operation unit 70 includes various types of switches, buttons, a touch panel 74, and so forth, to accept various types of operations from a user. A controller wheel 73 is a rotationally-operable operating member included in the operation unit 70. A power switch 72 is a pushbutton for switching between power on and power off. A recording medium 200 is, for example, a memory card, hard disk, or the like. A recording medium slot 201 stores the recording medium 200. The recording medium 200 stored in the recording medium slot 201 is thus capable of communication with the digital camera 100. A lid 202 serves as a lid for the recording medium slot 201.

Figure 2:
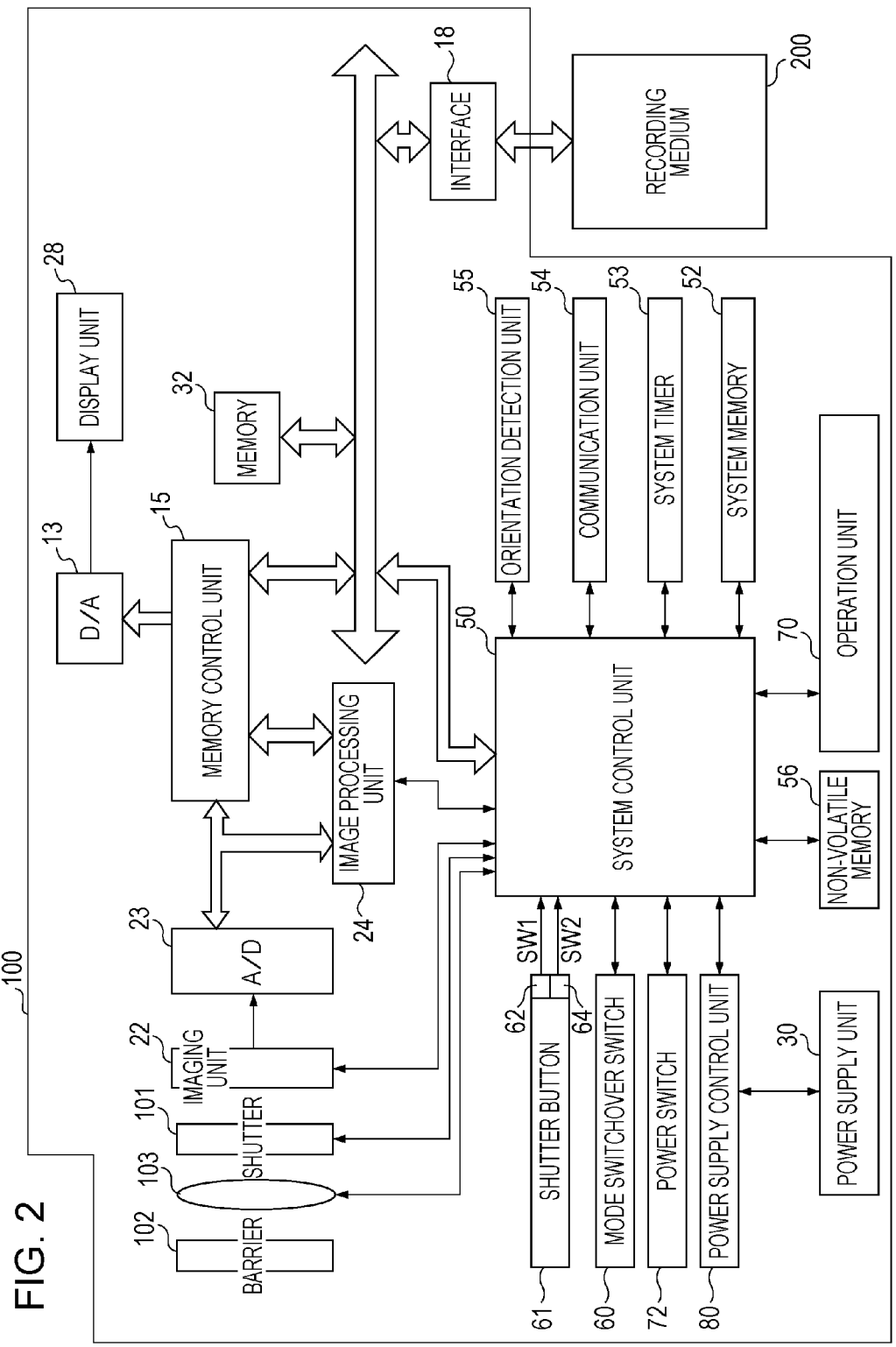
FIG. 2 is a block diagram illustrating a configuration example of a digital camera according to the embodiment.

Proceeding to FIG. 2, a shooting lens 103 is a lens group including a zoom lens and a focusing lens. A shutter 101 has an aperture function. An imaging unit 22 is an imaging device configured including a charge-coupled device (CCD) or complementary metal-oxide semiconductor (CMOS) device or the like. An A/D converter 23 converts analog signals into digital signals. The A/D converter 23 is used to convert analog signals output from the imaging unit 22 into digital signals. A barrier 102 covers the imaging system which includes the shooting lens 103, shutter 101, and imaging unit 22, to prevent soiling and damage thereof.

An image processing unit 24 preforms resize processing and color conversion processing, such as predetermined pixel interpolation and reduction, on data from the A/D converter 23 or from a memory control unit 15. The image processing unit 24 also performs predetermined computation processing using image data which has been shot, with a system control unit 50 performing exposure control and ranging control based on the results obtained from the computation. Through-the-lens (TTL) autofocus (AF) processing, auto exposure (AE) processing, and flash preliminary emission (EF) processing, are thus performed. The image processing unit 24 further performs predetermined computation using the image data that has been imaged, to perform TTL auto white balance (AWB) processing based on the obtained computation results.

Output data from the A/D converter 23 is either indirectly written to memory 32 via the image processing unit 24 and memory control unit 15, or directly written to the memory 32 via the memory control unit 15. The memory 32 stores image data acquired by the imaging unit 22 and converted into digital data by the A/D converter 23, and image data for display on a display unit 28. The memory 32 has sufficient storage capacity to store a predetermined number of still images, or a predetermined amount of time worth of moving images and audio.

The memory 32 also serves as memory for image display (video memory). A D/A converter 13 converts data for image display which is stored in the memory 32 into analog signals, and supplies to the display unit 28. Thus, the image data for display which has been written to the memory 32 is displayed on the display unit 28 via the D/A converter 13. The display unit 28 performs display on a display device such as a liquid crystal display (LCD) or the like, in accordance with analog signals from the D/A converter 13. This arrangement where A/D conversion is first performed by the A/D converter 23 and then digital signals stored in the memory 32 are subjected to D/A conversion at the D/A converter 13 and consecutively transferred to the display unit 28 for display, functions as an electronic viewfinder, thus enabling a live view display.

Non-volatile memory 56 is electrically erasable and recordable memory, such electrically-erasable programmable read-only memory (EEPROM) for example, or the like. The non-volatile memory 56 stores constants, programs, and so forth, for the system control unit 50 to operate. The term "program" as used here means a program to execute various types of flowcharts which will be described later in the present embodiment.

The system control unit 50 controls the overall digital camera 100. More particularly, the system control unit 50 realizes each process of the present embodiment described later, by executing programs stored in the non-volatile memory 56. Random access memory (RAM) is used for system memory 52. Loaded to the system memory 52 are constants, variables, programs read out from the non-volatile memory 56, and so forth, for the system control unit 50 to perform operations. The system control unit 50 also performs display control by controlling the memory 32, D/A converter 13, display unit 28, and so forth. A system timer 53 is a clocking unit which measures time used for various types of control, and time of an internal clock. The mode switchover switch 60, shutter button 61, and operation unit 70 are operating members and units for inputting various types of operation instructions to the system control unit 50.

The mode switchover switch 60 switches the operating mode of the system control unit 50 to one of a still image shooting mode, moving image shooting mode, reproduction mode, and so forth. Examples of modes included in the still image shooting mode include an auto shooting mode, an auto scene distinguishing mode, a manual mode, various types of scene modes which are shooting settings for individual shooting scenes, a program AE mode, a custom mode, and so forth. The mode switchover switch 60 can directly switch to any of these modes included in the still image shooting mode. Alternatively an arrangement may be made where the mode switchover switch 60 is used to first switch to the still image shooting mode, and then switch to any one of the modes included in the still image shooting mode using another operating member. Multiple modes may be included in the moving image shooting mode in the same way.

A first shutter switch 62 turns on partway through operation of the shutter button 61 provided to the digital camera 100, at a so-called half-press state (shooting preparation instruction), so as to generate a first shutter switch signal SW1. The first shutter switch signal SW1 causes operations to be started, such as AF processing, AE processing, AWB processing, EF processing, and so forth.

A second shutter switch 64 turns on upon completion of operation of the shutter button 61, at a so-called full-press state (shooting instruction), so as to generate a second shutter switch signal SW2. The second shutter switch signal SW2 causes the system control unit 50 to perform a series of shooting processes, from reading out signals from the imaging unit 22 to writing image data to the recording medium 200.

The operating members of the operation unit 70 are assigned functions as appropriate for each case by various types of function icons, displayed on the display unit 28, being selected and operated, and thus function as various types of function buttons. Examples of function buttons include a quit button, a return button, an image feed button, a jump button, a narrowing-down button, an attribute change button, and so forth. For example, if the menu button is pressed, a menu screen where various types of settings can be made is displayed on the display unit 28. The user can intuitively perform settings using the menu screen displayed on the display unit 28, four-way buttons, and a set button. The controller wheel 73 also is an operating member included in the operation unit 70, capable of rotational operation, and is used along with directional buttons to specify selection items.

A power supply control unit 80 is configured including a battery detecting circuit, a DC-DC converter, a switch circuit which switches blocks to be energized, and so forth. The power supply control unit 80 detects whether or not a battery has been mounted, the type of the battery, and remaining battery level. The power supply control unit 80 controls the DC-DC converter based on the detection results thereof and instructions from the system control unit 50, to supply necessary voltage to each part including the recording medium 200, as long as necessary.

A power supply unit 30 is configured including a primary battery such as an alkaline battery or lithium battery or the like, a secondary battery such as a nickel-cadmium (NiCd) battery, a nickel-metal hydride (NiMH) battery, a lithium-ion battery, or the like, an AC adapter, and so forth. A recording medium interface 18 serves as an interface to the recording medium 200, which is a memory card or hard disk or the like to record images which have been shot. The recording medium 200 is configured including semiconductor memory, a magnetic disk, or the like.

A communication unit 54 transmits and receives image signals and audio signals via a wireless or cable connection. The communication unit 54 can connect to a wireless local area network (LAN) and to the Internet. The communication unit 54 can transmit images shot at the imaging unit 22 (included live images) and recorded in the recording medium 200, and can also receive image data and various other types of information from external devices.

An orientation detection unit 55 detects the orientation of the digital camera 100 as to the gravitational direction. Whether an image shot at the imaging unit 22 is an image shot with the digital camera 100 held landscape or portrait can be determined based on the orientation detected by the orientation detection unit 55. The system control unit 50 can attach orientation information corresponding to the orientation determined by the orientation detection unit 55 to an image file of the image shot at the imaging unit 22, and can rotate the image when recording. An acceleration sensor, gyro sensor, or the like, can be used for the orientation detection unit 55.

The operation unit 70 includes the touch panel 74, by which touching of the display unit 28 can be detected, i.e., the display unit 28 is a touch-panel display unit. The touch panel 74 and display unit 28 can be configured integrally. For example, the touch panel 74 can be configured such that light transmittance thereof does not impede display on the display unit 28, and attached to the top layer of the display screen of the display unit 28. Input coordinates of the touch panel 74 and display coordinates on the display unit 28 are then coordinated. This enables a graphical user interface (GUI), which enables the user to seemingly be able to directly operate the screen displayed on the display unit 28. The system control unit 50 can detect the following operations and states on the touch panel 74.

Touch-down: a finger or pen starting to touch the touch panel 74

Touch-on: a finger or pen touching the touch panel 74

Touch-move: a finger or pen moving while touching the touch panel 74

Touch-up: a finger or pen departing from the touch the touch panel 74

Touch-off: no finger or pen touching the touch panel 74

Operation instructions are set to each touch operation beforehand. The system control unit 50 is notified of detection of operations on the touch panel 74, and coordinates of positions where a finger or pen is touching the touch panel 74, via an internal bus. Further, the system control unit 50 determines what sort of operation has been made on the touch panel 74, at what coordinates, based on the notified information.

A touch-move is determined regarding each of the vertical and horizontal components on the touch panel 74, based on change in positional coordinates of a finger or pen moving over the touch panel 74 (movement of the touch position), i.e., the moving direction. An operation from a touch-down on the touch panel 74 and then performing a certain touch-move is called a "swipe". Quickly swiping and then departing from the touch panel 74 or flipping is called a "flick". A flick is an operation where the finger is quickly moved over a certain distance while remaining in contact with the touch panel 74, and then departing from the touch panel 74. In other words, the flick is an operation in which the user quickly moves the finger over the touch panel as if flicking the touch panel with the finger. A flick can be detected by detecting a touch-move for a certain distance or longer at a certain speed or faster, and then immediately thereafter detecting a touch-up.

An operation of having two points touching at the same time and the distance between the two points being narrowed or widened is called a "pinch". The operation where the distance between the two points is narrowed is called a "pinch-in", where two fingers in contact with two points on the touch panel 74 are brought closer to each other while remaining in contact with the touch panel 74. Conversely, the operation where the distance between the two points is widened is called a "pinch-out".

The touch panel 74 may be any of a variety of types of touch panels, including a resistive touch screen, a capacitive touch screen, a surface acoustic wave touch screen, an infrared touch screen, an electromagnetic induction touch screen, an image recognition touch screen, an optical sensor touch screen, and so forth.

First, an overview of image enlarging/reducing operations and image feeding operations according to the present embodiment will be described. A still image or moving image that has been recorded in the recording medium 200 can be reproduced in the reproduction mode. When switched to the reproduction mode, a representational screen of still images and moving images stored in the recording medium 200 is displayed. One or multiple images are displayed on the display unit 28 at this time. In a case where multiple images are displayed, a selection frame surrounding the edge of an image can be moved, thereby selecting an image regarding which processing such as enlarged display or image deletion is to be performed.

When reproducing images, a zoom lever 75 functions as an enlargement/reduction button. Sliding the zoom lever 75 to the wide-angle side during single reproduction causes transition to an enlargement mode. Sliding the zoom lever 75 to the telephoto side then disengages the enlargement mode, and further sliding the zoom lever 75 to the telephoto side from this state reduces the displayed image, to where a list display can be made of multiple images on the display unit 28. An arrangement may be made where the number of times of sliding and the enlargement factor are correlated, so that the enlargement factor can be adjusted in stages.

Enlargement and reduction of images can be performed by pinching operations on the touch panel 74 as well. When a pinch-out is performed, the image is enlarged based on the movement of the two points which are touching the touch panel 74. When a pinch-in is performed during single reproduction, the displayed image is reduced based on the movement of the two points which are touching the touch panel 74. When a pinch-in is performed in a state of the list display, the number of images displayed on the display unit 28 is increased accordingly.

Operating the controller wheel 73 during single reproduction (display of a single image) allows image feeding to be performed, where an image recorded in order before or following the displayed image is displayed. Turning the controller wheel 73 to the left, or pressing the left button of the four-way buttons allows the image previous in order to be displayed (image reverse-feed). Turning the controller wheel 73 to the right, or pressing the right button of the four-way buttons allows the image next in order to be displayed (image forward-feed).

Image feeding can also be performed during single reproduction by performing a touch-move on the touch panel 74. A touch-move to the left direction can display the image next in order, and a touch-move to the right direction can display the image previous in order.

Figure 3:
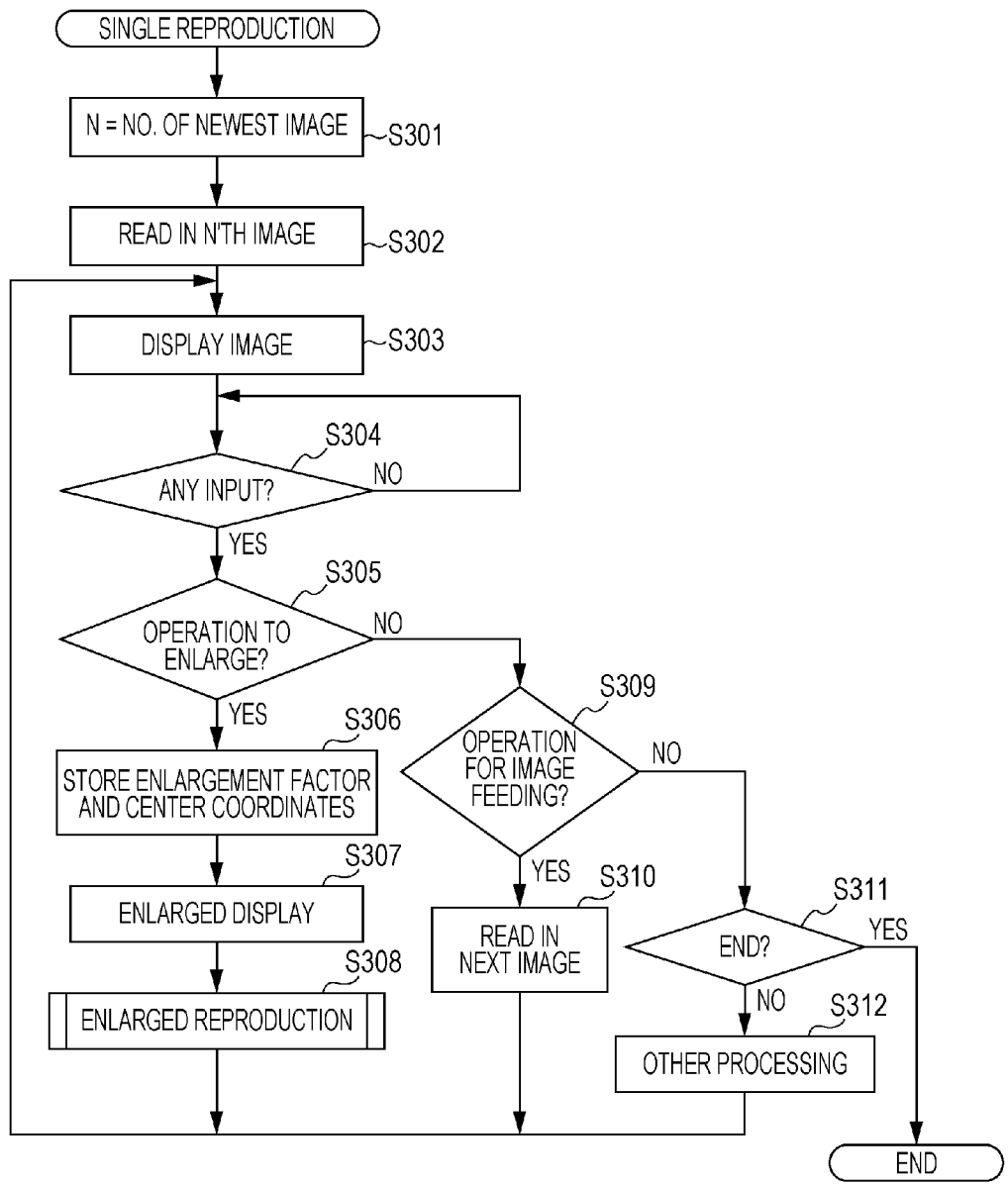
FIG. 3 is a flowchart illustrating processing of single reproduction according to the embodiment.

Next, operations of the present embodiment will be described with reference to FIGS. 3 through 6. FIG. 3 is processing performed in single reproduction, where one image at a time is displayed on the display unit 28. This processing is realized by the system control unit 50 reading out a program stored in the non-volatile memory 56 to the system memory 52 and executing the program.

Pressing the mode switchover switch 60 when in a recording mode where still images or moving images can be shot switches the mode to the reproduction mode, and the processing illustrated in FIG. 3 is started.

In S301, the system control unit 50 acquires an image No. N of the newest image of the images recorded in the recording medium 200.

In S302, the system control unit 50 reads the N'th image from the recording medium 200 and loads it to the memory 32.

Figure 7A:
FIG. 7A is a diagram illustrating a screen during single reproduction.

In S303 the system control unit 50 decodes the image loaded to the memory 32 in S302, and displays the image on the display unit 28 such as illustrated in FIG. 7A. FIG. 7A illustrates an example of the image 701 being displayed so that the entire image 701 fits within the display unit 28.

In S304, the system control unit 50 determines whether any of the operating members included in the operation unit 70 have been operated. In a case where determination is made that any one has been operated, the flow advances to S305. Otherwise, the flow stands by at S304 awaiting an operation to be performed.

In S305, the system control unit 50 determines whether the zoom lever 75 has been slid to the wide-angle side or a pinch-out operation has been performed (i.e., whether an enlarging operation has been performed). In a case where determination is made that the zoom lever 75 has been slid to the wide-angle side or a pinch-out operation has been performed, the flow advances to S306, and otherwise to S309.

In S306, the system control unit 50 stores, in the system memory 52, the enlargement factor (factor of enlargement according to the enlarging operation) of the display on the display unit 28, and the coordinate position of the overall image, enlarged corresponding to the enlarging operation in S305, which should be at the center of the displayed portion (center coordinates, display position).

Figure 7B:
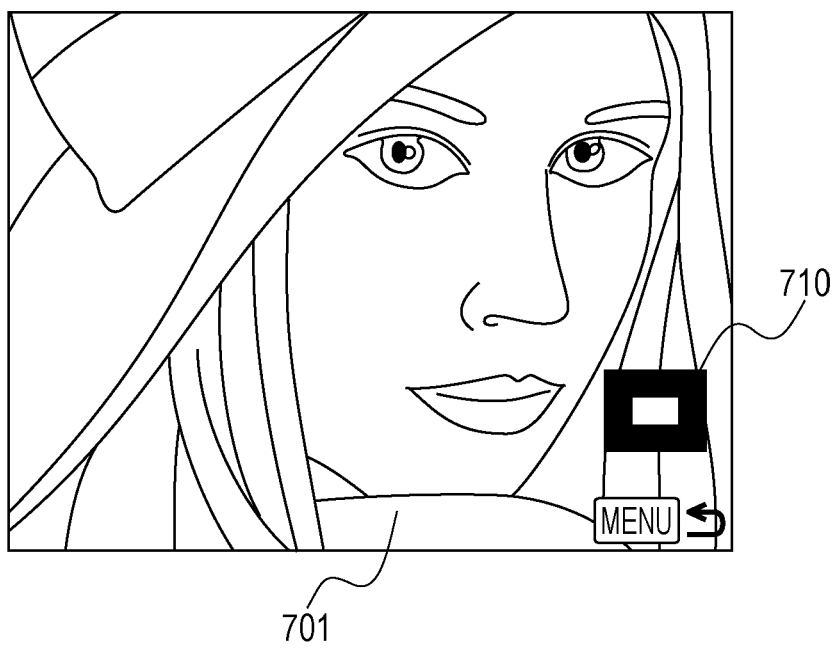
FIG. 7B is a diagram illustrating a screen during enlarged reproduction.

In S307, the system control unit 50 causes the display unit 28 to display an enlarged image based on the enlargement factor and center coordinates stored in S306, as illustrated in FIG. 7B, and the flow advances to S308. FIG. 7B is a display example of an enlarged display of an image 701. An indicator 710, indicating which portion of the image is being displayed in an enlarged manner, is displayed at a part of the display unit 28. In single reproduction, all of the displayed image is displayed within the display unit 28, both in the vertical direction and in the horizontal direction, but in the enlarged display, at least one region is not displayed since the image is being displayed in an enlarged manner.

In S308, the system control unit 50 performs enlarged reproduction processing. This enlarged reproduction processing will be described later with reference to FIGS. 4A and 4B.

In S309, the system control unit 50 determines whether or not an operation has been performed for image forward feeding (or reverse feeding). If such an operation has been performed the flow advances to S310, and otherwise advances to S311.

In S310, the system control unit 50 reads out the image next in the order instructed by image forward feeding (or image previous in order if image reverse feeding) from the recording medium 200 to the memory 32, so as to be displayed on the display unit 28 in S303. The order for feeding images may be in the order of file names, or in the order of date and time of shooting, for example.

In S311, the system control unit 50 determines whether or not an operation to end reproduction has been made, by pressing of the mode switchover switch 60 or the like. In a case where an operation to end reproduction has been made, the processing illustrated in FIG. 3 ends, and otherwise the flow advances to S312.

In S312, the system control unit 50 performs other processing, such as processing to open a menu screen, processing to display an index display, or the like.

The enlarged reproduction processing of S308 in FIG. 3 described above will be described with reference to FIGS. 4A and 4B. While description will be made regarding touch operations in FIGS. 4A and 4B, the enlargement, reduction, and feeding of images can be performed from the operation unit 70 as well.

In S401, the system control unit 50 determines whether or not a touch-down has been performed on the touch panel 74. In a case where determination is made that a touch-down has been performed, the flow advances to S405; otherwise, the flow advances to S402.

In S402, the system control unit 50 determines whether or not input has been made to the operation unit 70 other than at the touch panel 74. In a case where determination is made that input has been made to the operation unit 70, the flow advances to S403; otherwise, the flow returns to S401 and awaits input again.

In S403, the system control unit 50 determines whether or not the zoom lever 75 has been slid to the telephoto side to instruct ending of the enlarged reproduction and transition to single production. In a case where determination is made that transition to single reproduction has been instructed, the enlarged reproduction is ended and the image display of S303 in FIG. 3 is performed; otherwise, the flow advances to S404.

In S404, the system control unit 50 performs processing corresponding to operations other than touch operations on the touch panel 74. Examples of processing performed here include a deletion function to delete an image which has been shot, a protect function to protect an image so that it is not deleted (imparting with a protect attribute), a favorites function to register an image in favorites (imparting with a favorites attribute), and so forth.

Figure 5:
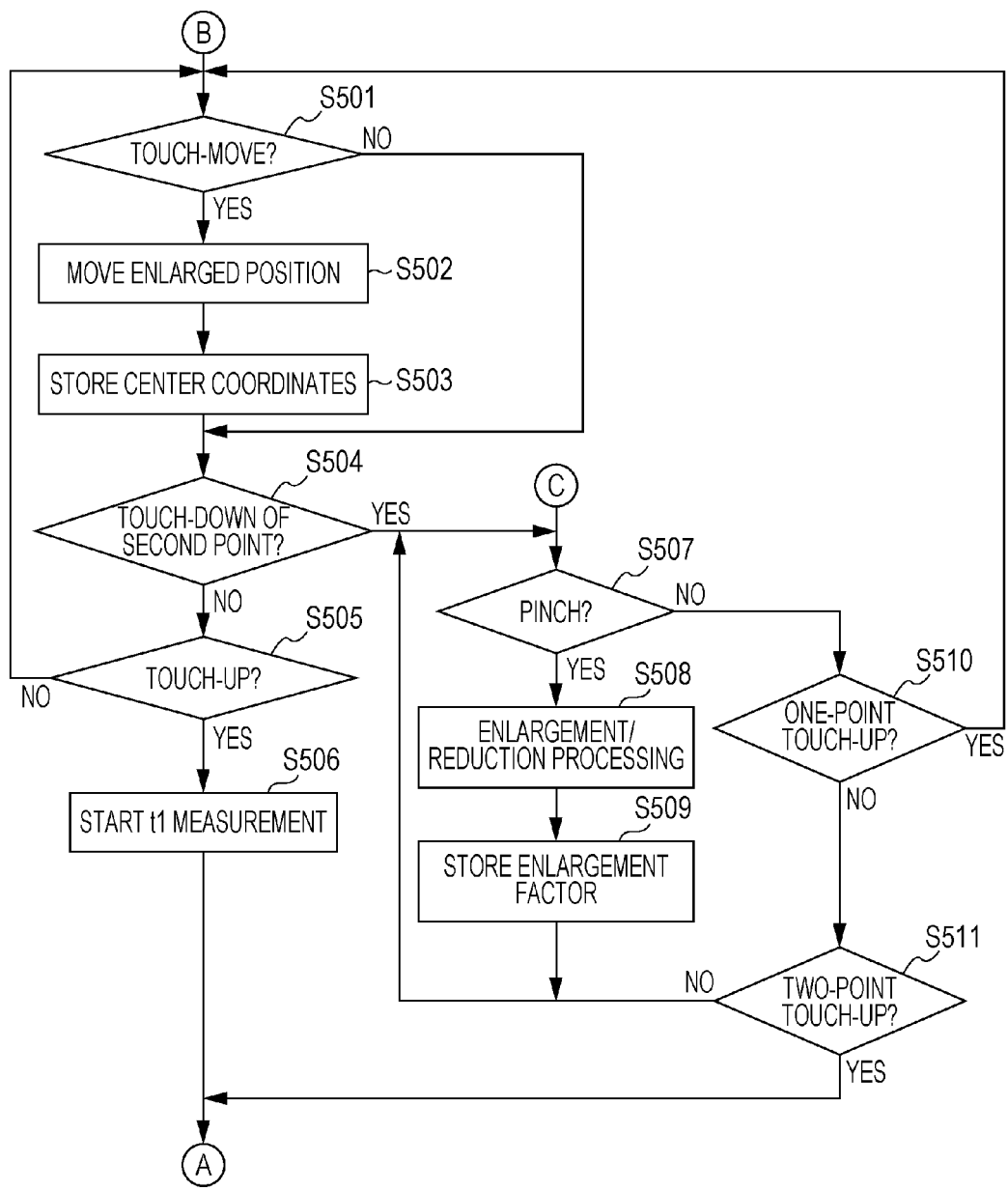
FIG. 5 is a flowchart illustrating enlarged reproduction processing according to the embodiment.

In S405, the system control unit 50 ends measurement of a t1, of which measurement starts in S506 of FIG. 5 which will be described later, and the flow advances to S406. In a case where measurement of t1 has not been started in S506 in the enlargement reproduction processing, S405 is skipped and the flow advances to S406.

In S406, the system control unit 50 determines whether or not there has been a touch-down of one more point in addition to the one point already touched, i.e., whether or not there has been touch-down of a second point. In a case where determination is made that there has been touch-down of a second point, the flow advances to S507 in FIG. 5 which will be described later; otherwise, the flow advances to S407. In a case where there has been touch-down of three or more points at this time, just the two first touch-down points are handled, and the third and subsequent touch-down points are disregarded.

In S407, the system control unit 50 stores the coordinates (X0, Y0) of the first touch-down point on the touch panel 74 in the system memory 52, and the flow advances to S408.

In S408, the system control unit 50 determines whether or not the elapsed time t1 regarding which measurement has ended at S405 is equal to or longer than a predetermined period of time T1 (first period). In a case where determination is made that the elapsed time t1 is equal to or longer than the predetermined period of time T1, the flow advances to S409; otherwise (if within the period), the flow advances to S410. In a case where t1 had not been measured here, the flow advances to S409. T1 may be set as 1 second, for example.

Figure 8A:
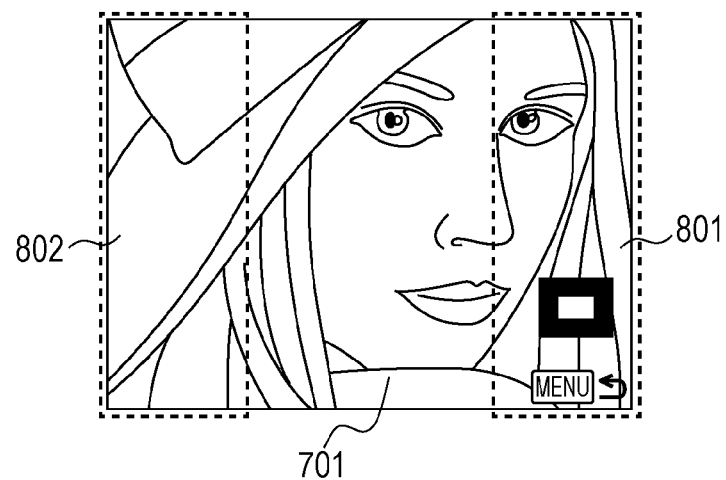
FIGS. 8A through 8C are explanatory diagrams, FIG. 8A of swipe detection regions, FIG. 8B of swipe detection regions, and FIG. 8C of flick detection regions.

In S409, the system control unit 50 determines whether or not the touch-down point (X0, Y0) is in a swipe detection region 801 or 802 in FIG. 8A. If in the swipe detection region 801 or 802, the flow advances to S411; otherwise, the flow advances to S501 in FIG. 5 described later. At this time, which of the swipe detection region 801 and 802 the touch-down was performed in is stored in the system memory 52. The swipe detection region 801 is situated in a range including the right edge of the touch panel 74, and the swipe detection region 802 is situated in a range including the left edge of the touch panel 74 (the opposite side from the right edge). Note that the swipe detection regions are set in regions excluding the middle of the touch panel 74. When performing a swipe to move an enlarged position, it is conceivable that the user will tend to perform a touch-down at the central area of the touch panel 74, so this arrangement enables the user to perform enlarged image feeding by consciously touching the edges. Accordingly, a touch operation is determined to be a touch-move relating to enlarged image feeding when performing a touch-move from the right edge inwards of the swipe detection region 801, and when performing a touch-move from the left edge inwards of the swipe detection region 802. That is to say, when a swipe is performed from within a swipe detection region, this is determined to be a touch-move relating to enlarged image feeding. On the other hand, in a case where no touch is detected within the swipe detection regions 801 and 802 but a touch-move is performed from the outside of the swipe detection regions, this is determined to be a touch-move relating to moving an enlarged position.

Figure 8B:
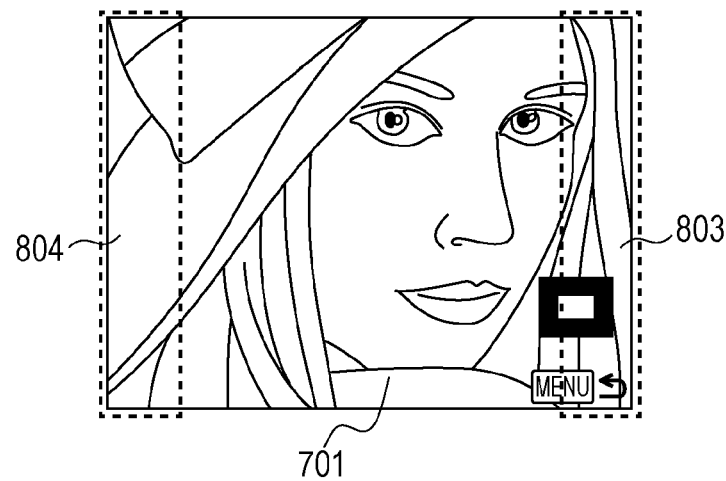

In S410, the system control unit 50 determines whether or not determines whether or not the touch-down point (X0, Y0) is in a swipe detection region 803 or 804 in FIG. 8B. If in the swipe detection region 803 or 804, the flow advances to S411; otherwise, the flow advances to S501 in FIG. 5 described later. At this time, which of the swipe detection region 803 and 804 the touch-down was performed in is stored in the system memory 52. The swipe detection region 803 is situated in a range including the right edge of the touch panel 74, and the swipe detection region 804 is situated in a range including the left edge of the touch panel 74. A touch operation is determined to be a touch-move relating to enlarged image feeding when performing a touch-move from the right edge inwards of the swipe detection region 803 has been stored, and when performing a touch-move from the left edge inwards of the swipe detection region 804 has been stored. Note that in a case where no touch is detected within the swipe detection regions 803 and 804 but a touch-move is performed from the outside of the swipe detection regions, this is determined to be a touch-move relating to moving an enlarged position.

The area of the swipe detection regions is changed depending on the amount of time elapsed from the last time a touch operation not relating to enlarged image feeding was performed. In the present embodiment, the swipe detection regions 803 and 804 are smaller in area than the swipe detection regions 801 and 802. In the illustrated example, the width in the horizontal direction (X-axial direction) is smaller for the swipe detection regions 803 and 804 as compared to the swipe detection regions 801 and 802. Thus, the area of the swipe detection regions is reduced within the predetermined period of time T1 from a touch operation not relating to enlarged image feeding, so the probability that the user will erroneously touch the swipe detection regions while consecutively performing swipes in a short period of time to move an enlarged position is small. Alternatively, the swipe detection regions may be eliminated for the duration of the predetermined period of time T1.

Figure 9A:
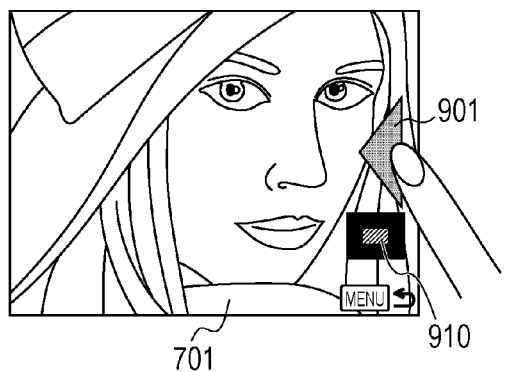
FIG. 9A illustrates an example of a screen showing a guide and a fixed frame.

In S411, the system control unit 50 displays a guide 901 and a fixed frame 910 on the display unit 28, as illustrated in FIGS. 9A through 9E, sets a fixed mode to on, and the flow advances to S412. The guide 901 is a guide provided to indicate that a touch-move toward the central area of the screen performs an enlarged image feed. Thus, displaying the guide 901 when touching a swipe detection region necessary for enlarged image feeding enables the user to quickly determine whether an enlarged image feed will be performed or an enlarged position movement will be performed, if swiping from a touched position. The user can thus know whether or not the operation which he/she is performing is an operation for enlarged image feeding, before a situation occurs such as the user performing a swipe with the intention of performing a touch-down in a swipe detection region 801 through 804 but unintentionally performing an enlarged position movement. Alternatively, an arrangement may be made where no guide 901 indicating the swipe detection regions 801 through 804 is displayed, but the guide 901 is displayed upon having detected a touch-down. This is because displaying the guide over the image being displayed narrows the range of the image which the user can confirm. FIG. 9A illustrates a case where a touch-down has been performed in the swipe detection region 801 or 803; in a case where a touch-down has been performed in the swipe detection region 802 or 804 a guide 901 will be displayed at the left side prompting a touch-move to the right. During the fixed mode period, the fixed frame 910 illustrated in FIGS. 9A through 9E is displayed, indicating to the user that a touch-move will not cause an enlarged position movement. The appearance of the indicator 710 (color, etc.) indicating what range of the image is being displayed enlarged may be changed to be displayed as with the fixed frame 910, thereby enabling the user to identify that the enlarged range is in an unchanging state.

In S412, the system control unit 50 determines whether or not there has been a touch-down of one more point in addition to the one point already touched, i.e., whether or not there has been touch-down of a second point. In a case where determination is made that there has been touch-down of a second point, the flow advances to S413; otherwise, the flow advances to S414.

In S413, the system control unit 50 hides the guide 901 and fixed frame 910, sets the fixed mode to off, and the flow advances to S507 in FIG. 5 which will be described later. While operations using touches of two points or more (multi-touch operations) change the enlargement factor by pinching operations, enlarged image feeding is not performed in this state, so there is no need to display the guide 901. Once the fixed mode is set to off, the display scan can be changed and enlarged position movement can be performed.

In S414, the system control unit 50 determines whether or not there has been performed a touch-move of a distance D1 (illustrated in FIG. 9B) or greater in the horizontal direction toward the central area of the touch panel 74 from the coordinates of touch-down in the swipe detection regions 801 to 804 in S409 or S410. In a case where determination is made that there has been performed such a touch-move, the flow advances to S415; otherwise, the flow advances to S416. More specifically, an absolute value of the difference between an X value of touch-down coordinates stored in S407 (X0) and an X value of the point on the touch panel 74 being touched after the touch-move (Xi), i.e., absolute value of the difference between Xi and X0, is compared with the predetermined distance D1. In a case where the swipe detection region 801 or 803 at the right side has been stored in the system memory 52 as being where a touch-down was performed, in S409 or S410, determination is made that the touch-move is toward the central area if the sign of (X0-Xi) is plus. In the same way, in a case where the left side has been stored in the system memory 52, determination is made that the touch-move is toward the central area if the sign of (X0-Xi) is minus. Note that the Y component of the touch-move components (moving component in the vertical direction) of the touch-move is not taken into consideration here.

Figure 9B:
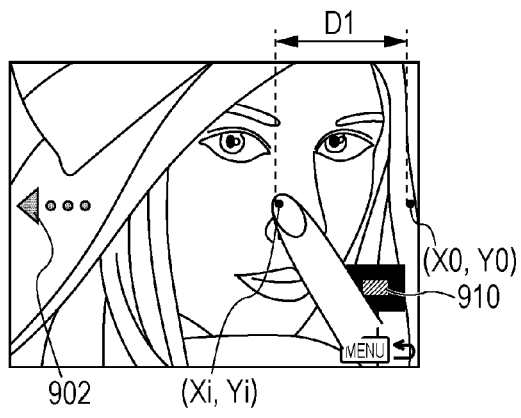
FIG. 9B illustrates an example of a screen showing a guide, a predetermined distance, and a fixed frame.

In S415, the system control unit 50 displays a guide 902 such as illustrated in FIG. 9B on the display unit 28, and the flow advances to S418. The guide 902 indicates that the touch-move has been detected, and that continuing the touch-move in the direction indicated by the guide 902 will enable enlarged position movement to be performed. While FIG. 9B illustrates the guide prompting a touch-move further to the left in a case where a touch-move has been performed in the left direction, a guide to the right is displayed in a case where a touch-move has been performed in the right direction.

In S416, the system control unit 50 determines whether or not a touch-up has been performed on the touch panel 74. In a case where determination is made that a touch-up has been performed, the flow advances to S417; otherwise, the flow returns to S412.

In S417, the system control unit 50 hides whichever of the guide 901 or 902 which is displayed, and the fixed frame 910, sets the fixed mode to off, and the flow returns to S401.

In S418, the system control unit 50 determines whether or not a touch-up has been performed on the touch panel 74. In a case where determination is made that a touch-up has been performed, the flow advances to S417; otherwise, the flow returns to S419.

In S419, the system control unit 50 determines whether there has been a touch-move of a predetermined distance D2 (illustrated in FIG. 9D) or greater in the horizontal direction toward the central area of the touch panel 74 from the touch-down point (coordinate indicating point (X0, Y0)). A touch-move is movement of a touch position or movement of a coordinate input position. In a case where determination is made that there has been performed such a touch-move, the flow advances to S420; otherwise, the flow returns to S418. Whether or not there has been a touch-move departing a predetermined distance or more (departing by D2 or more) from the point (X0, Y0) is performed by comparing an absolute value of the difference between the X value of touch-down coordinates stored in S407 (X0) and the X value of the point on the touch panel 74 being touched after the touch-move (Xi), with the predetermined distance D2. In a case where the swipe detection region 801 or 803 at the right side has been stored in the system memory 52 as being where a touch-down was performed, in S409 or S410, determination is made that the touch-move is toward the central area if the sign of (X0-Xi) is plus. In the same way, in a case where the left side has been stored in the system memory 52, determination is made that the touch-move is toward the central area if the sign of (X0-Xi) is minus. Note that the Y component of the touch-move components (moving component in the vertical direction) of the touch-move is not taken into consideration here.

Figure 9C:
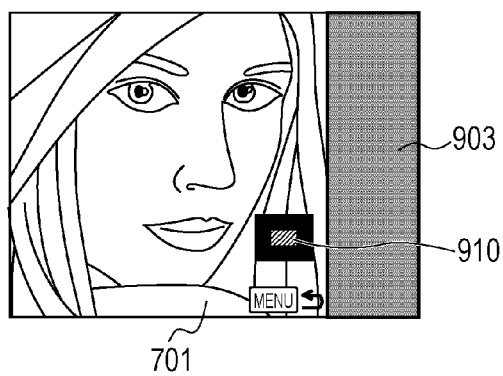
FIG. 9C illustrates an example of a screen showing an enlarged image partway fed and a fixed frame.
Figure 9D:
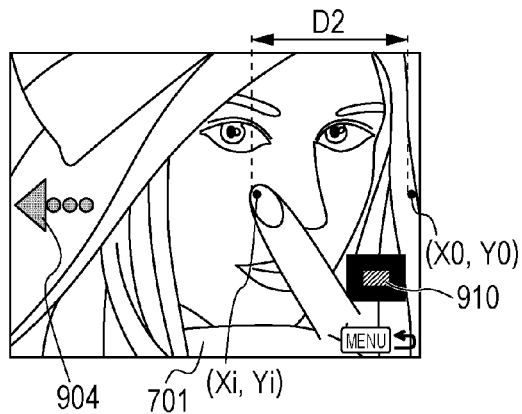
FIG. 9D illustrates an example of a screen showing a guide, a predetermined distance, and a fixed frame.

In S420, the system control unit 50 displays a guide 904 such as illustrated in FIG. 9D. The guide 904 indicates to the user that a touch-move of D2 or greater has been detected from one of the swipe detection regions 801 to 804. The guide 904 also indicates to the user that if the user performs a touch-up from the touched position at that time without tracing back by a touch-move, the touch operation which the user has performed will be detected as a touch operation instructing enlarged image feeding, and that enlarged image feeding will be executed. In single reproduction, image feeding is often performed by touch-move, so the user can intuitively perform operations since the same touch-move has been assigned to enlarged image feeding. While FIG. 9D illustrates a case where a touch-move has been performed to the left direction, the guide 904 will be displayed to the right side if a touch-move is performed to the right side.

In S421, the system control unit 50 determines whether or not a touch-up has been performed on the touch panel 74. In a case where determination is made that a touch-up has been performed, the flow advances to S422; otherwise, the flow advances to S423. In a case where determination is made in S419 that a touch-move of the predetermined distance D2 or greater has been performed, and thereafter determination is made in S421 that a touch-up has been performed, enlarged image feeding is performed in S422.

Enlarged image feeding is performed in S422. This enlarged image feeding will be described later with reference to FIG. 6. If enlarged image feeding is performed by a touch-move in the left direction, the image is switched to the next (N+1) image of the image before switching, and if enlarged image feeding is performed by a touch-move in the right direction, the image is switched to the previous (N−1) image of the image before switching. The image display after switching is displayed with an enlargement based on the enlargement factor and enlargement position information before switching.

In S423, the system control unit 50 determines whether or not there has been a touch-move in the opposite direction as the movement in the X-axial direction from X0 to Xi (determination of whether there has been touch movement retracing). In a case where determination is made that there has been touch movement retracing, the flow advances to S425; otherwise, the flow advances to S424. In a case where a touch-up has been performed in S421 without retracing of the touch-move, determination is made that the touch-move has been with the predetermined distance D2 or more between the touch end point and the touch start point in a predetermined direction. However, in a case where determination is made that there has been retracing, this is deemed not to be a touch operation for enlarged image feeding, and enlarged image feeding is not performed.

In S424, the system control unit 50 determines whether or not there has been a touch-up on the touch panel 74. In a case where determination is made that that there has been a touch-up, the flow advances to S422; otherwise, the flow returns to S423.

In S425, the system control unit 50 hides the guide 903 and fixed frame 910, sets the fixed mode to off, and the flow advances to S426.

In S426, the system control unit 50 determines whether or not there has been a touch-up performed on the touch panel 74. In a case where determination is made that that there has been a touch-up, the flow returns to S401; otherwise, the system control unit 50 awaits for a touch-up.

Processing downstream of the enlarged reproduction processing in S406, S409, S410, S413, and S426 in FIGS. 4A and 4B will be described with reference to FIG. 5.

In S501, the system control unit 50 determines whether or not there has been a touch-move performed on the touch panel 74. In a case where determination is made that there has been a touch-move, the flow advances to S502; otherwise, the flow advances to S504.

Figure 10A:
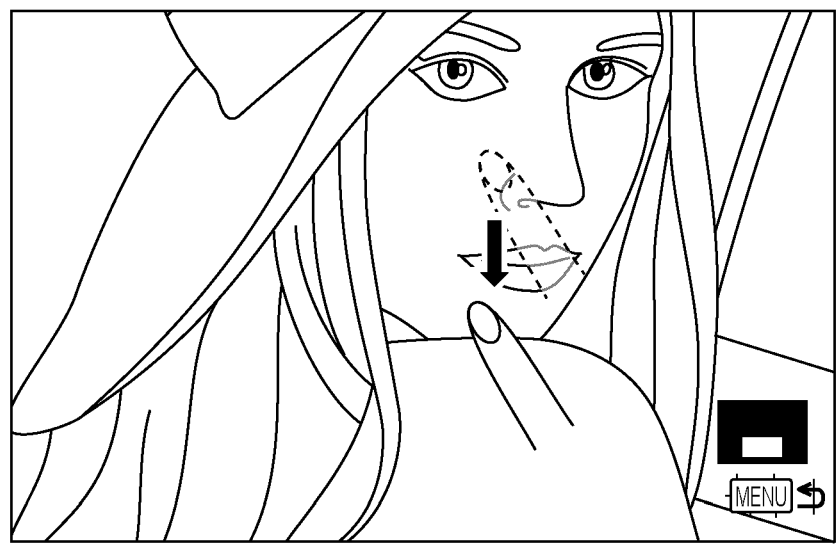
FIGS. 10A and 10B are examples of screens showing movement of an enlarged portion.
Figure 10B:

In S502, the system control unit 50 performs an enlarged position movement where the displayed portion of the image displayed on the display unit 28 in an enlarged manner (enlarged position) is changed, and the flow advances to S503. In an enlarged position movement, the enlargement factor of the image displayed is the same as the enlargement factor of the image before the enlarged position movement. The range of the image displayed on the display unit 28 is changed (partial change) in accordance with the amount and distance of movement of the touch-move, as illustrated in FIGS. 10A and 10B. In a case where a range around the central area of the image 701 is being displayed in an enlarged manner, and an enlarged position movement is performed, as illustrated in FIG. 10A, a range (portion) of the image 701 above that which had been displayed is displayed, as illustrated in FIG. 10B.

In S503, the system control unit 50 stores, in the system memory 52, the coordinate position (center coordinates) in the overall image, at the center position in the horizontal direction and vertical direction of the range which has come to be displayed on the display unit 28 after the enlarged position movement, and the flow advances to S504.

In S504, the system control unit 50 determines whether or not there has been a touch-down of one more point in addition to the one point already touched, i.e., whether or not there has been touch-down of a second point. In a case where determination is made that there has been touch-down of a second point, the flow advances to S507; otherwise, the flow advances to S505. In a case where there has been touch-down of three or more points at this time, just the two first touch-down points are handled, and the third and subsequent touch-down points are disregarded.

In S505, the system control unit 50 determines whether or not there has been a touch-up performed on the touch panel 74. In a case where determination is made that there has been a touch-up, the flow advances to S506; otherwise, the flow returns to S501. An arrangement may be made where, in a case that a flick has been performed in which a touch-move operation is performed at a certain speed or faster and then a touch-up is performed, momentum scrolling is performed where scrolling is performed for a certain amount of time after the touch-up. In this case, the enlarged position movement in which the display position is moved is continued even after the touch-up.

Figure 4A:
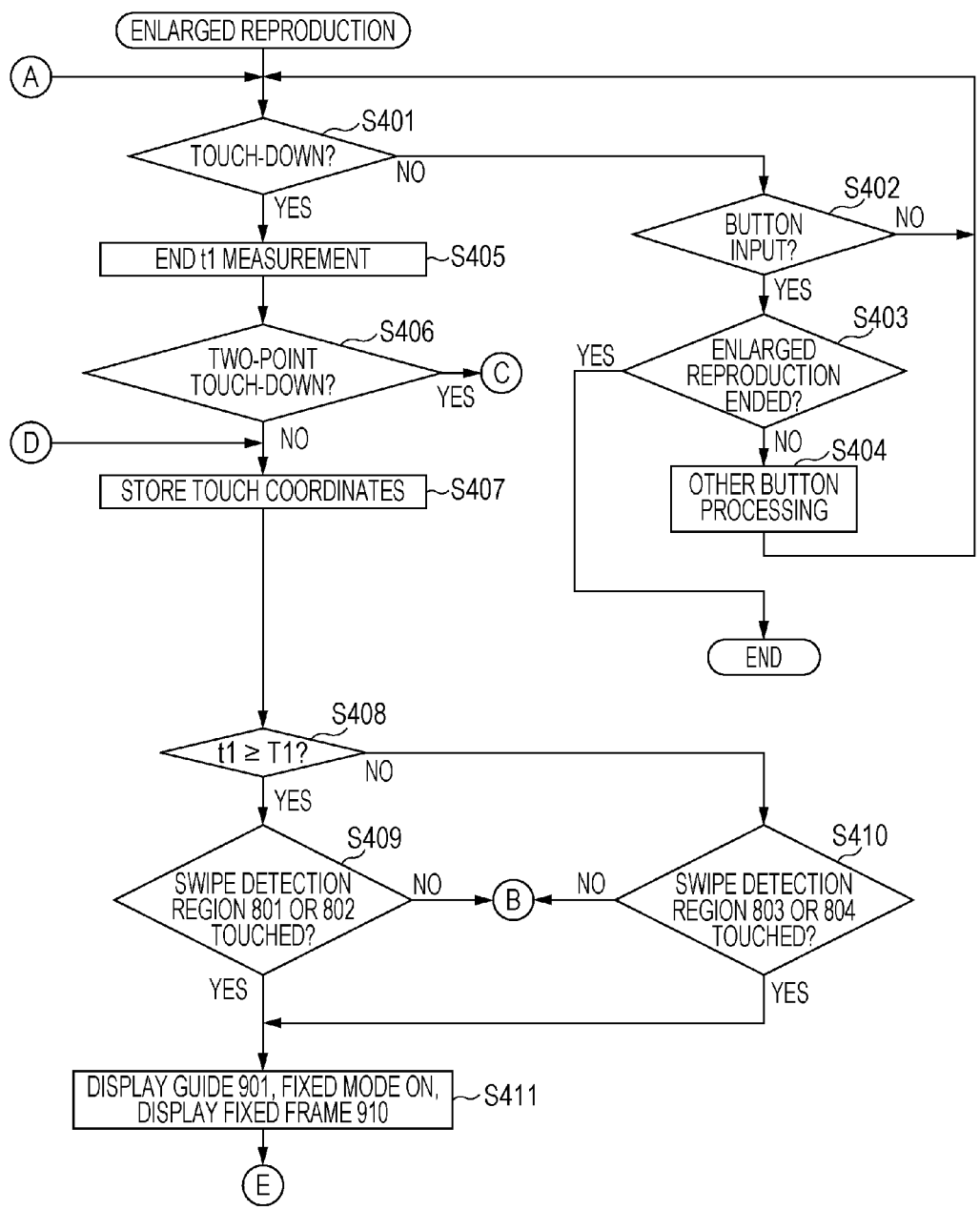
FIGS. 4A and 4B are a flowchart illustrating enlarging processing according to the embodiment.
Figure 4B:
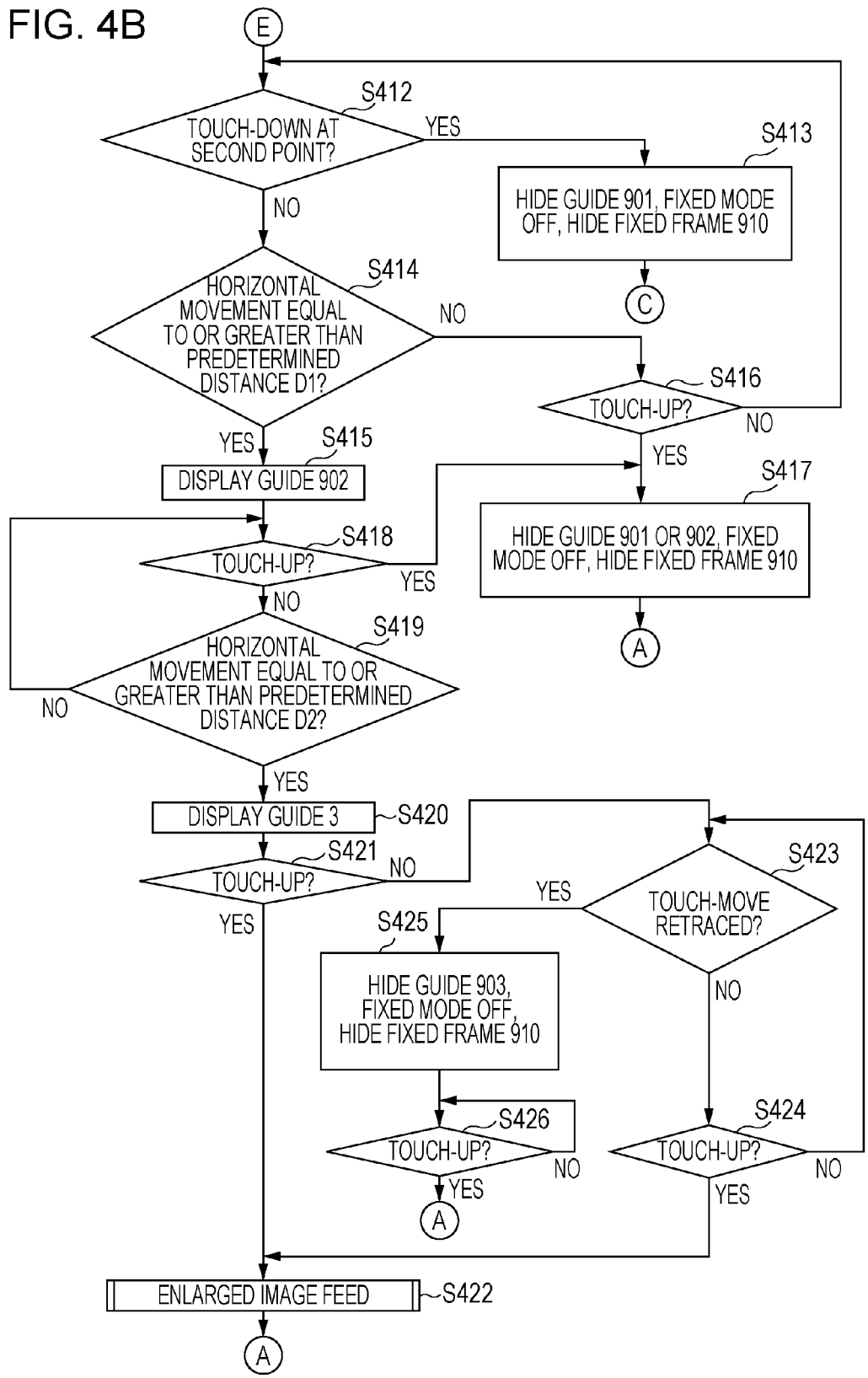

In S506, the system control unit 50 starts measuring the elapsed time t1, and the flow advances to S401 in FIG. 4A.

In S507, the system control unit 50 determines whether or not there has been a pinch-in or pinch-out operation of two touch-down points. In a case where determination is made that a pinch operation has been performed, the flow advances to S508; otherwise, the flow advances to S510.

In S508, the system control unit 50 changes the enlargement factor of the image displayed on the display unit 28. In a case where a pinch-in operation has been performed in S507, reduction processing is performed, while in a case where a pinch-out operation has been performed enlargement processing is performed, and the flow advances to S509.

In S509, the system control unit 50 stores the enlargement factor of the image enlarged or reduced in S508 in the system memory 52.

In S510, the system control unit 50 determines whether or not there has been a touch-up of one point of the two points which had been recognized as being in touch. In a case where determination is made that there has been a touch-up, the flow returns to S501; otherwise, the flow advances to S511.

In S511, the system control unit 50 determines whether or not there has been a touch-up of both of the two points which had been recognized as being in touch. In a case where determination is made that there has been a touch-up, the flow advances to S401 in FIG. 4A; otherwise, the flow advances to S507.

Figure 6:
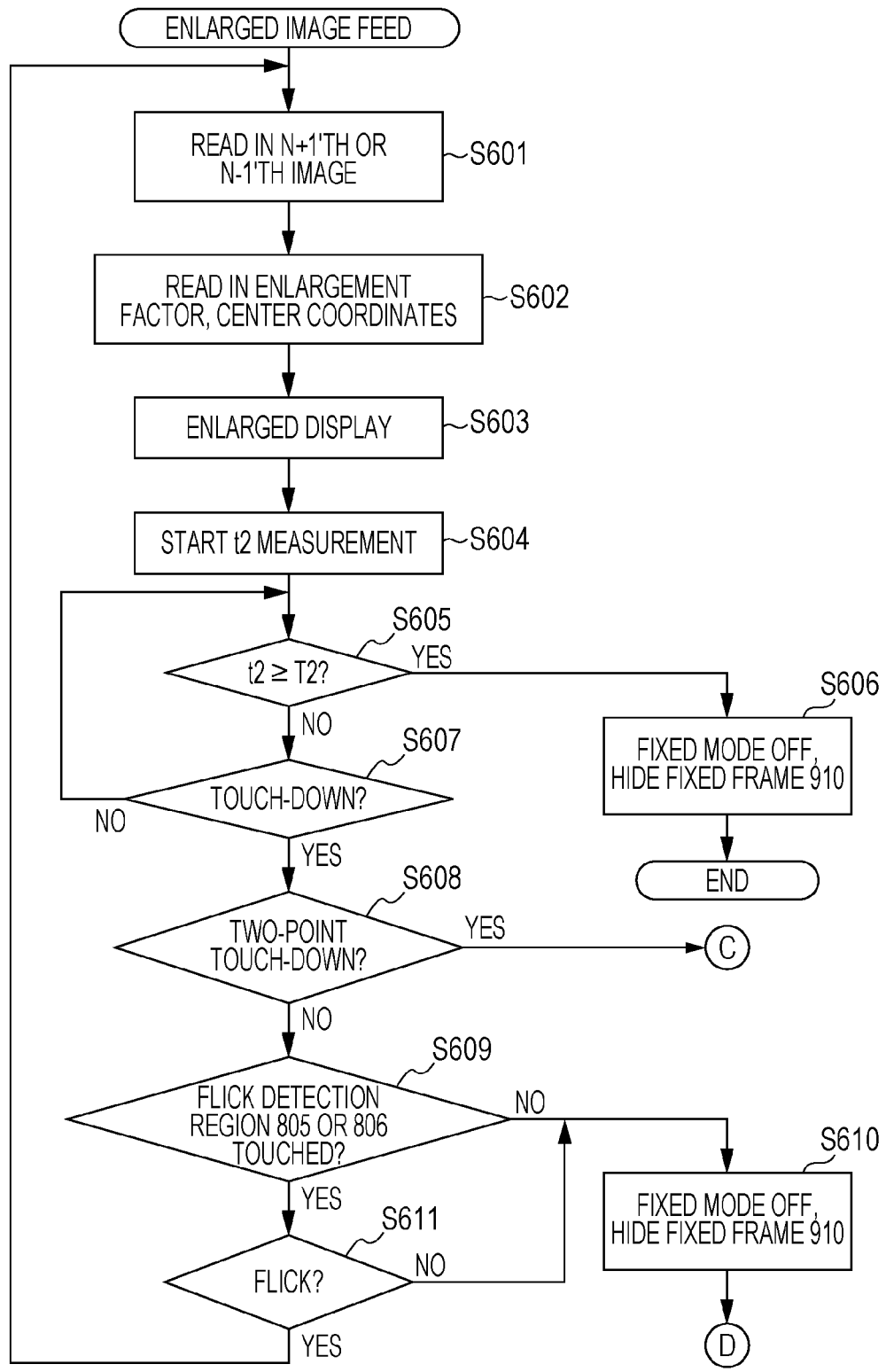
FIG. 6 is a flowchart illustrating enlarged image feed processing according to the embodiment.

The enlarged image feed in S422 in FIG. 4B will be described with reference to FIG. 6.

In S601, the system control unit 50 reads in the N+1'th or N−1'th image, and the flow advances to S602. If enlarged image feeding is performed to the right direction by a swipe in the enlarged image feeding or flick in the fixed mode, the image which is the previous (N−1) image of the N'th image is read in, and if performed to the left direction, the image which is the next (N+1) image of the N'th image is read in.

In S602, the system control unit 50 reads in the newest enlargement factor and center coordinates stored in the system memory 52, and the flow advances to S603.

Figure 9E:
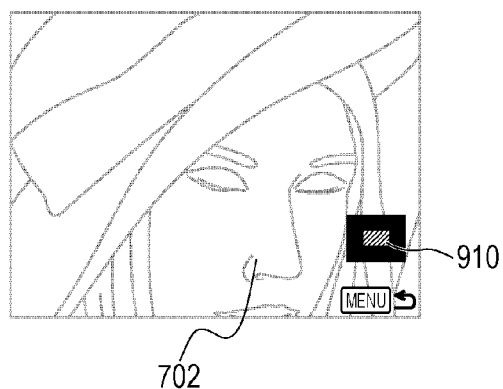
FIG. 9E illustrates an example of a screen showing an enlarged image after having been fed and a fixed frame.

In S603, the system control unit 50 displays the image 702 read in S601 as illustrated in FIG. 9E, using the enlargement factor and center coordinates of the image 701 before switching, which were read in S602, and the flow advances to S604. More specifically, the enlargement factor (either enlargement from equal number of pixels or enlargement from predetermined display size) is the same before and after switching. The enlargement range is set such that the ratio of center coordinates of the enlargement range as to the overall image before switching is the same as the ratio of center coordinates of the enlargement range as to the overall image after switching. A center position of the partial area to be enlargingly displayed in the other image data such that ratios of respective longitudinal and lateral sizes of the image data before switching to the center position of the enlargingly displayed partial area of the image data before switching correspond respectively to ratios of respective longitudinal and lateral sizes of the other image data to the center position of the partial area to be enlargingly displayed in the other image data. If the images are of the same size and same aspect ratio, the enlargement range will be the same. After switching the image, the fixed frame 910 is updated as necessary, so as to indicate the enlargement range of the image after switching. Thus, fine differences in the images can be easily compared, by switching the image with the enlargement factor and enlargement position (enlargement range) maintained.

In S604, the system control unit 50 starts measuring elapsed time t2.

In S605, the system control unit 50 determines whether or not the elapsed time t2 regarding which measurement has started at S604 has reached a predetermined period of time T2. In a case where determination is made that the predetermined period of time T2 has elapsed, the flow advances to S606; otherwise, the flow advances to S607. The predetermined period of time T2 may be set as 2 seconds, for example.

In S606, the system control unit 50 sets the fixed mode to off and hides the fixed frame 910, ends the enlarged image feeding processing, and the flow advances to S401 in FIG. 4A.

In S607, the system control unit 50 determines whether or not there has been a touch-down operation on the touch panel 74. In a case where determination is made that there has been a touch-down operation, the flow advances to S608; otherwise, the flow returns to S605.

In S608, the system control unit 50 determines whether or not the number of touch-down points is two or more. In a case where determination is made that the number is two or more, the flow advances to the above-described S507 in FIG. 5; otherwise, the flow advances to S610.

Figure 8C:
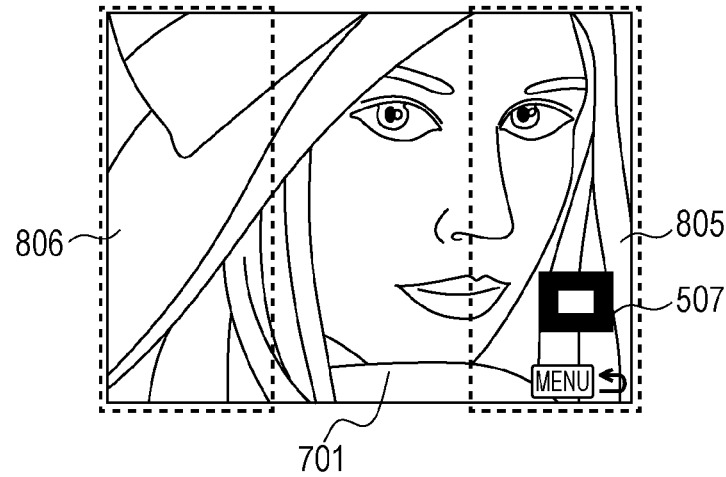

In S609, the system control unit 50 determines whether or not the touch-down point is in a flick detection region 805 or 806 in FIG. 8C. If in the flick detection region 805 or 806, the flow advances to S611; otherwise, the flow advances to S610. At this time, which of the flick detection region 805 and 806 the touch-down was performed in is stored in the system memory 52. The flick detection region 805 is situated to the right side from the central area of the touch panel 74, and the flick detection region 806 is situated to the left side from the central area of the touch panel 74. Accordingly, in a case where the flick detection region 805 has been stored, a touch operation is determined to be a touch-move relating to enlarged image feeding in the fixed mode when performing a touch-move from the right side toward the central area. In a case where the flick detection region 806 has been stored, a touch operation is determined to be a touch-move relating to enlarged image feeding in the fixed mode when performing a touch-move from the left side toward the central area. In the fixed mode, a flick where a touch-move and touch-up are quickly performed after a touch-down (second touch operation) can be performed to perform enlarged image feeding processing. Accordingly, if the user desires to consecutively perform enlarged image feeding, flicking may be consecutively performed rather than swiping. The flick detection regions 805 and 806 are wider in area as compared to the swipe detection regions 801 through 804 (width in the X-axial direction is greater), so the user can touch more easily and flick operations for enlarged image feeding is detected more readily in the fixed mode. Note that instructing enlarged image feeding is not restricted to flicking in the fixed mode, and swiping may be used to this end as well. In this case, if determination is made that the flick detection region 805 or 806 has been touched in S609, the flow advances to S411. A guide such as the above-described guide 901 may be displayed in the fixed mode period as well, if touch-down to the flick detection region 805 or 806 is detected.

In S610, the system control unit 50 sets the fixed mode to off, hides the fixed frame 910, and the flow advances to S407 in FIG. 4A. When performing flicking or swiping related to enlarged image feeding, it is conceivable that there would be more cases of starting the operation from either the left or right side of the touch panel 74, and not the central area. Accordingly, in a case of touching the central area of the touch panel 74 which is not the flick detection region 805 or 806 during the fixed mode period, this is determined not to be a touch operation relating to enlarged image feeding. The fixed mode can be exited by touching the central area which is not the flick detection region 805 or 806, and thus a touch-move operation for enlarged position movement or the like can be detected more readily.

In S611, the system control unit 50 determines whether or not a flick has been performed. In a case where determination is made that a flick has been performed, the flow advances to the enlarged image feeding in S601; otherwise, the flow advances to S610. Thus, in the fixed mode enlarged image feeding can be performed with flick operations which involve little movement, rather than performing a swipe starting from a swipe detection region and moving the predetermined distance D2 or longer. Accordingly, the operational feeling can be improved when consecutively performing enlarged image feeding in a short amount of time.

According to the processing described above, the user can perform image feeding by a touch operation, with the enlargement factor and enlargement position remaining the same. Display information, such as the display scale and display position of the displayed image is held when performing image feeding, so the user can easily compare details of multiple images by touch operations.

While description has been made in the above example regarding an arrangement where enlarged image feeding is performed holding both the enlargement factor and enlargement position (portion), enlarged image feeding may be performed holding one or the other of enlargement factor and enlargement position. Also, instead of center coordinates, an enlarged portion including a face recognized by personal authentication, or an autofocus frame may be stored, and the image displayed in an enlarged manner so that this portion is displayed on the display unit 28.

Note that the order of images displayed next in the swipe or flick direction is not restricted to that illustrated in the present embodiment, and an arrangement may be made where the previous image (N−1) before switching may be displayed to the left direction and the next image (N+1) before switching may be displayed to the right direction. Further, an arrangement may be made where, instead of the images before or after the displayed image, images are read in and displayed in an enlarged manner according to each date, every ten images, every 100 images, or the like. Thus, in a case where similar shooting is performed every certain amount of time or dates, the shot images can be compared at certain intervals.

Also, the swipe detection region may be changed according to the enlargement factor. In a case where the enlargement factor is small, the range displayed as to the overall image is large, so the distance of enlarged position movement is small. Accordingly, it is conceivable that the user will operate around the middle region more frequently. Thus, making the swipe detection region larger will facilitate enlarged image feeding.

Also, display of all of the guides 901, 902, and 904 is not essential; just one guide may be displayed with change in shape, color, darkness, and so forth. Changing the display of a single guide may indicate that a touch to a swipe detection region has been detected, a touch-move in a certain direction of a certain distance or longer has been detected, and a swipe operation for enlarged image feeding has been detected. Instead of displaying the guide 902 or 904, the N'th enlarged image may be moved in accordance to the amount and direction of movement of the touch-move. The N'th enlarged image may be moved in accordance with the touch-move, and the portion of the image where the N'th image has moved from be displayed as a gray display 903, as illustrated in FIG. 9C. In this case as well, enlarged image feeding processing is performed if a touch-move is performed in the horizontal direction for the predetermined distance D2 or longer and then a touch-up is performed. Also, an arrangement may be made where, in the enlarged image feeding, the entire next image (or previous image) is temporarily displayed before displaying the enlarged image of the next image (or previous image). A non-enlarged image may be displayed in S603 in FIG. 6 immediately before displaying the enlarged image, which allows the positional relation of subjects in the position displayed in an enlarged manner to be comprehended. Accordingly, the user can comprehend what is in the non-displayed portion during enlarged image feeding, thereby facilitating enlarged position movement and enlargement adjustment.

The user may set the swipe detection region. Also, an arrangement may be made where enlarged image feeding is performed if a long touch is performed in which the touching time is longer than a predetermined amount of time, and then a touch-move is performed, regardless of whether or not a swipe detection region has been touched (i.e., even if touching the central portion). The swipe detection regions 801 to 804 and flick detection regions 805 and 806 are not restricted to the areas and layouts illustrated in the present embodiment, may be wider or narrower, may be at the top and bottom edges, and may be multiple or in one location. In a case where the regions are provided in multiple locations, it is sufficient if the total area of the multiple regions satisfy the relation (flick detection regions 805 and 806)> (swipe detection regions 801 and 802)>(swipe detection region 803 and 804).

Note that while description has been made regarding displaying a guide when touching the swipe detection region 801 to 804 and flick detection region 805 and 806, the user may be notified of detection of the touch by light emission from the screen or an emission device such as a light-emitting diode (LED) or the like, or vibrations from a vibrating unit. A guide instructing an operation method of enlarged image feeding by touch operations may be given to the user on the display unit 28, at the same time as or immediately after one image having been displayed on the screen in an enlarged manner in S307 in FIG. 3. Alternatively, in a case where the image displayed in an enlarged manner is an image shot by continuous shooting where a predetermined number of images are consecutively shot in a predetermined amount of time, an operation method of enlarged image feeding by touch operations may be given.

Note that control of the system control unit 50 may be performed by a single hardware component, or shared among multiple hardware components, to control the overall apparatus.

While an example has been illustrated of realizing the present invention in accordance to touch operations performed on a touch panel used as a coordinate input unit, the present invention is not restricted to this arrangement, and the present invention can be realized using any device (e.g., mouse, pointer, etc.) capable of inputting coordinates on a screen (position input on a screen) besides touch operations.

In a case of mouse operations, a left-click of the mouse may serve as a touch-down, moving the mouse in the clicked state may serve as a touch-move, and releasing the clicked button may serve as a touch-up. The series of operations of clicking to input coordinates, then moving the mouse and releasing the button may serve as a swipe. In a case of a pointer, instructing coordinates on a screen with the pointer and inputting the coordinates of that point by a button or the like may serve as a touch-down, and moving the point in a state with the coordinates input may serve as a touch-move. Further, stopping the coordinate input by the button or the like to cancel coordinate input may serve as a touch-up, and the series of operations of coordinate input by the button, movement of the pointer, and cancelling coordinate input, may serve as a swipe. Reducing the movement distance of the operation serving as a touch-move within the swipe series of operations may serve as a flick. The processing of the above-described flowcharts can thus be executed by such equivalent substitutions.

By applying the present invention to a portable device, and providing the predetermined regions to portions operable by fingers of the hand holding the device, the user can execute enlarged image feeding without losing balance of the device when performing the touch operations according to the present invention. For example, the above-described digital camera 100 is a portable device. The user can hold the digital camera 100 with the one right hand, and operate the operation unit 70 and touch panel 74 with the fingers of the right hand (e.g., thumb or index finger). In this case, the zoom lever 75 can be operated with the index finger of the right hand to perform enlargement/reduction operations. Further, the shutter button 61 can be operated by the index finger of the right hand. Also, the right edge portion of the touch panel 74 can be operated with the thumb of the right hand alone to instruct enlarged image feeding. The left hand can also be used if operating of the left edge portion of the touch panel 74 is desired; the right hand does not have to be released. That is to say, the user can perform the series of operations of enlarging and enlarged image feeding of displayed images while browsing the image with the digital camera 100 held in the right hand, without having to change the hand holding the digital camera 100.

An example has been described above in which enlarged image feeding is performed with the enlargement position and enlargement factor maintained, in accordance with a swipe from swipe detection regions provided to the left and right of the display unit 28. However, it is needless to say that other functions may be executed in accordance with other touch operations performed on the same screen (i.e., during enlarged display). Also, application of a modification is valid in which two fingers are touched to the display unit 28 (multi-touch) and a swipe operation is made to the right or left by both fingers at the same time, whereby the displayed image is switched to a non-enlarged image (i.e., single reproduction), before (in a case of a right swipe) or after (in a case of a left swipe) the displayed image. In this case, the layout may be designed such that the touch-down position may be at any position, or such that this arrangement operates only when touch-down is performed at a predetermined region. Also, application of a modification is valid in which just one finger is touched to the display unit 28 (single-touch) and a swipe operation is made to the right or left by the finger after having maintained the touch for a predetermined amount of time from touch-down or longer, whereby the displayed image is switched to a non-enlarged image (i.e., single reproduction), before (in a case of a right swipe) or after (in a case of a left swipe) the displayed image. Also, functions assigned to a multi-touch swipe or a swipe after a long-touch may conceivably include, besides assigning the functions of returning to single reproduction and performing forward/reverse feeding of images, performing enlarged display of a next or a previous image applying an enlargement position/enlargement factor set for each image. A conceivable example of an enlargement position/enlargement factor set for each image may include an enlargement position and enlargement factor based on information of focus adjustment position (focus position) at the time of shooting the image. Other conceivable examples include an enlargement position and enlargement factor based on a position and size of a particular subject, such as a face detected in the image, an enlargement position and enlargement factor based on that used for displaying that image the previous time, and so forth. Also, application of a modification is valid in which swipe regions are provided to the upper and lower edges of the display unit 28 in the same screen, which differ from those described above, with different functions being executed in accordance with having detected a swipe from these swipe regions provided to the upper and lower edges toward the central area. A conceivable example is image feeding by jumping by dates, where the image feeding is performed such that the image jumps to the first image of each date and time of shooting, or the like.

While images have been described in the above embodiment, the present invention is not restricted to images. For example, the present invention is also applicable to cases of documents such as Web pages and electronic book pages (display objects) being switched to other pages in a state of an enlarged display (a portion of the entirety being displayed).

While description has been made in the above embodiment regarding application of the present invention to an imaging apparatus, the present invention is not restricted to this example, and various applications may be made to touch-panel type display control apparatuses having a display unit which displays images and/or information. That is to say, the present invention is applicable to, for example, personal computers, personal digital assistants (PDAs), cellular phone terminals, portable image viewers, printer apparatuses which have a display, digital photo frames, music players, gaming device, electronic book readers, and so forth.

Other Embodiments

The present invention may also be realized by executing the following processing. That is to say, software (programs) realizing the functions of the above-described embodiment is supplied to a system or apparatus via a network or any of various types of recording media, a computer (or central processing unit (CPU) or microprocessor unit (MPU)) of the system or apparatus reads out and executes the program code. In this case, the program, and the storage medium storing the program, make up the present invention.

According to the present invention, user operationality can be improved in a case of performing enlarged image feeding on a touch panel with the enlargement factor and enlarged position being maintained.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions. Note that the above-described embodiments are only embodiments of the present invention, and that the embodiments may be combined as suitable.

This application claims the benefit of Japanese Patent Application No. 2014-048124, filed Mar. 11, 2014, which is hereby incorporated by reference herein in its entirety.

What is claimed is:

1. A display control apparatus comprising:
  a detection unit configured to detect touch operations;
  a display control unit configured to effect control such that a portion of an image is displayed on a display unit rather than an entire image;
  a portion changing unit configured to change a displayed portion of the image when a portion of the image is being displayed, in accordance with a predetermined touch operation including moving of a touch position having been performed from outside of a predetermined region; and
  a control unit configured to effect control such that, when a portion of the image is being displayed, the displayed image is switched to a different image and a display portion of the different image is displayed on the display unit based on the display portion of the image before switching, in accordance with the predetermined touch operation including moving of a touch position having been performed from within the predetermined region.

2. A display control apparatus comprising:
  a detection unit configured to detect touch operations;
  a display control unit configured to effect control such that a portion of an image is displayed on a display unit rather than an entire image;
  a scale changing unit configured to change a display scale of the image displayed on the display unit;
  a portion changing unit configured to change a displayed portion of the image when a portion of the image is being displayed, in accordance with a touch operation including moving of a predetermined touch position has been performed from outside of a predetermined region; and
  a control unit configured to effect control such that, when a portion of the image is being displayed, the displayed image is switched to a different image and the different image is displayed on the display unit at a display scale based on the display scale of the image before switching, in accordance with the predetermined touch operation including moving of a touch position having been performed from within the predetermined region.

3. The display control apparatus according to claim 2, wherein the control unit effects control such that a display portion of the different image is displayed on the display unit based on the display portion of the image before switching, in accordance with the predetermined touch operation having been performed.

4. The display control apparatus according to claim 1, further comprising:
a storage unit configured to store at least one of information indicating the displayed portion of the image displayed on the display unit, and information indicating a display scale,
wherein the control unit effects control such that, when the portion of the image is being displayed on the display unit, a different image is displayed on the display unit based on at least one of information indicating the displayed portion of the image before switching and information indicating a display scale, stored in the storage unit, in accordance with the predetermined touch operation having been performed from within the predetermined region.

5. The display control apparatus according to claim 1, wherein, upon starting of a touch to the predetermined region being detected when the portion of the image is being displayed on the display unit, the display control unit performs a first display whereby the user can recognize that the predetermined region has been touched.

6. The display control apparatus according to claim 1, wherein the predetermined region is situated at least at each of a side of the display unit in a first direction and a side in a second direction opposite to the first direction, not including a central area of the display unit.

7. The display control apparatus according to claim 1, wherein the predetermined region includes an edge region of the display unit.

8. The display control apparatus according to claim 1, wherein the display control unit does not display the predetermined region.

9. The display control apparatus according to claim 1, wherein the predetermined touch operation is a touch operation including movement of a touch position where a distance between a touch start point and a touch end point is equal to or greater than a first distance in a predetermined direction.

10. The display control apparatus according to claim 9, wherein, in response to the movement of the touch position being equal to or greater than the first distance in the predetermined direction from within the predetermined region, the display control unit performs a second display indicating that movement of a touch position from the predetermined region has been detected.

11. The display control apparatus according to claim 9, wherein, in response to the movement of the touch position being equal to or greater than a second distance, which is shorter than the first distance, in the predetermined direction from within the predetermined region, the display control unit performs a third display relating to the movement direction of the touch position.

12. The display control apparatus according to claim 1, wherein, during a first period from a touch operation different from the predetermined touch operation having been detected by the detecting unit, the control unit effects control such that the area of the predetermined region is reduced.

13. The display control apparatus according to claim 1, wherein, during a second period from another image being displayed on the display unit according to a display portion or display scale based on the display portion or display scale of the image before switching, the display control unit effects control such that the area of the predetermined region is increased.

14. The display control apparatus according to claim 1, wherein, during a period in which at least the predetermined touch operation is being performed, the display control unit performs a fourth display whereby the user can recognize that the portion of the displayed image is not changed by moving of the touch position.

15. The display control apparatus according to claim 6, wherein, in a case where the predetermined touch operation is the predetermined touch operation from a predetermined region at the first direction side, the control unit displays an image which is after in a display order, and in a case where the predetermined touch operation is the predetermined touch operation from a predetermined region at the second direction side, displays an image which is previous in the display order.

16. The display control apparatus according to claim 9, wherein, during a second period from another image being displayed on the display unit according to a display portion or display scale based on the display portion of the image before switching, the display control unit effects control such that a display portion of a different image is displayed on the display unit based on the display portion of the image before switching, in response to a touch operation having been performed which includes starting of a touch to the predetermined region, and movement of the touch position where a distance between a touch start point and a touch end point is equal to or greater than a third distance, which is shorter than the first distance, in the predetermined direction.

17. The display control apparatus according to claim 1, further comprising:
an imaging unit.

18. The display control apparatus according to claim 9, wherein the control unit does not switch the displayed image if detecting that the touch position has moved the first distance from the touch start point to the touch end point in the predetermined direction and then has moved in an opposite direction from the predetermined direction.

19. The display control apparatus according to claim 1, wherein the display control apparatus is a portable apparatus, and the predetermined region is at a position operable by a finger or thumb of a hand holding the display control apparatus.

20. A display control apparatus comprising:
a detection unit configured to detect input of a position on a screen;
a display control unit configured to effect control such that a portion of an image is displayed on a display unit rather than an entire image;
a portion changing unit configured to change a displayed portion of the image when a portion of the image is being displayed, in accordance with a predetermined operation, including moving of the detected input position, having been performed from outside of a predetermined region; and a control unit configured to effect control such that, when a portion of the image is being displayed on the display unit, the displayed image is switched to a different image and a display portion of the different image is displayed on the display unit based on the display portion of the image before switching, in accordance with the predetermined operation including moving of the detected input position having been performed from within the predetermined region.

21. A display control apparatus comprising:
a detection unit configured to detect input of a position on a screen;
a display control unit configured to effect control such that a portion of an image is displayed on a display unit rather than an entire image;
a scale changing unit configured to change a display scale of the image displayed on the display unit;
a portion changing unit configured to change a displayed portion of the image when a portion of the image is being displayed, in accordance with a predetermined operation, including moving of the detected input position, having been performed from outside of a predetermined region; and
a control unit configured to effect control such that, when a portion of the image is being displayed on the display unit, the displayed image is switched to a different image and the different image is displayed on the display unit at a display scale based on the display scale of the image before switching, in accordance with the predetermined operation including moving of the detected input position having been performed from within the predetermined region.

22. A control method of a display control apparatus having a detection unit configured to detect touch operations, the method comprising:
effecting control such that a portion of an image is displayed on a display unit rather than an entire image;
changing a displayed portion of the image when a portion of the image is being displayed, in accordance with a predetermined touch operation including moving of a touch position having been performed from outside of a predetermined region out of a region where the image is displayed; and
effecting control such that, when a portion of the image is being displayed, the displayed image is switched to a different image and a display portion of the different image is displayed on the display unit based on the display portion of the image before switching, in accordance with the predetermined touch operation including moving of a touch position having been performed from within the predetermined region.

23. A control method of a display control apparatus having a detection unit configured to detect touch operations, the method comprising:
effecting control such that a portion of an image is displayed on a display unit rather than an entire image;
changing a display scale of the image displayed on the display unit;
changing a displayed portion of the image when a portion of the image is being displayed, in accordance with a predetermined touch operation including moving of a touch position having been performed from outside of a predetermined region out of a region where the image is displayed; and
effecting control such that, when a portion of the image is being displayed, the displayed image is switched to a different image and a display portion of the different image is displayed on the display unit at a display scale based on the display scale of the image before switching, in accordance with the predetermined touch operation including moving of a touch position having been performed from within the predetermined region.

24. A control method of a display control apparatus having a detection unit configured to detect input of a position on a screen, the method comprising:
effecting control such that a portion of an image is displayed on a display unit rather than an entire image;
changing a displayed portion of the image when a portion of the image is being displayed, in accordance with a predetermined operation, including moving of the detected input position, having been performed from outside of a predetermined region; and
effecting control such that, when a portion of the image is being displayed, the displayed image is switched to a different image and a display portion of the different image is displayed on the display unit based on the display portion of the image before switching, in accordance with the predetermined operation including moving of the detected input position having been performed from within the predetermined region.

25. A control method of a display control apparatus having a detection unit configured to detect input of a position on a screen, the method comprising:
effecting control such that a portion of an image is displayed on a display unit rather than an entire image;
changing a display scale of the image displayed on the display unit;
changing a displayed portion of the image when a portion of the image is being displayed, in accordance with a predetermined operation, including moving of the detected input position, having been performed from outside of a predetermined region; and
effecting control such that, when a portion of the image is being displayed on the display unit, the displayed image is switched to a different image and the different image is displayed on the display unit at a display scale based on the display scale of the image before switching, in accordance with the predetermined operation including moving of the detected input position having been performed from within the predetermined region.

26. A non-transitory computer-readable medium storing a program for executing the method according to claim 22.

27. A non-transitory computer-readable medium storing a program for executing the method according to claim 23.

* * * * *